United States Patent
Boyina et al.

(10) Patent No.: US 9,027,044 B2
(45) Date of Patent: May 5, 2015

(54) ADAPTIVE MEDIA CONTENT PRESENTATION METHODS AND SYSTEMS

(75) Inventors: Srikamal Boyina, Visakhapatnam (IN); Saleem Mohammed, Chennai (IN); Kiran Patibandla, Chennai (IN); Syed Mohasin Zaki, Chennai (IN); Vinod Krishnan Surianarayanan, Chennai (IN); Vijay Senthil Angayarkanni, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 90 days.

(21) Appl. No.: 13/329,880

(22) Filed: Dec. 19, 2011

(65) Prior Publication Data
US 2013/0160037 A1 Jun. 20, 2013

(51) Int. Cl.
*H04H 60/32* (2008.01)
*H04N 21/475* (2011.01)
*H04N 21/4788* (2011.01)
*H04N 21/6543* (2011.01)
*H04N 21/8541* (2011.01)

(52) U.S. Cl.
CPC ....... *H04N 21/4751* (2013.01); *H04N 21/4755* (2013.01); *H04N 21/4788* (2013.01); *H04N 21/6543* (2013.01); *H04N 21/8541* (2013.01)

(58) Field of Classification Search
CPC ............ H04N 21/482; H04N 21/4826; H04N 21/472; H04N 21/442; H04N 21/6582; H04N 21/44222
USPC .......................................... 725/32–36, 46, 14
See application file for complete search history.

(56) References Cited

U.S. PATENT DOCUMENTS

| | | | |
|---|---|---|---|
| 2002/0194586 A1* | 12/2002 | Gutta et al. ...................... | 725/10 |
| 2005/0102696 A1* | 5/2005 | Westberg ......................... | 725/46 |
| 2006/0136965 A1* | 6/2006 | Ellis et al. ........................ | 725/46 |
| 2007/0157241 A1* | 7/2007 | Walker ............................. | 725/46 |
| 2008/0092156 A1* | 4/2008 | Ferrone ........................... | 725/13 |
| 2008/0244636 A1* | 10/2008 | Card ................................ | 725/25 |
| 2009/0320059 A1* | 12/2009 | Bolyukh ......................... | 725/32 |
| 2012/0030587 A1* | 2/2012 | Ketkar ........................... | 715/751 |
| 2012/0110621 A1* | 5/2012 | Gossweiler, III ............... | 725/46 |
| 2012/0271882 A1* | 10/2012 | Sachdeva et al. ............. | 709/204 |

* cited by examiner

*Primary Examiner* — Hai V Tran
*Assistant Examiner* — Aklil Tesfaye

(57) ABSTRACT

An exemplary method includes an adaptive media content presentation system detecting an interaction of a user with a media content program, generating a playing pattern associated with the media content program based on the detected interaction of the user with the media content program, and applying the playing pattern to at least one of a presentation of the media content program and a presentation of an additional media content program. Corresponding methods and systems are also disclosed.

18 Claims, 11 Drawing Sheets

Playing Pattern for Avatar

| Scene Type | Include | Exclude |
|---|---|---|
| Action Scenes | ☑ | ☐ |
| Romance Scenes | ☐ | ☑ |
| Scary Scenes | ☑ | ☐ |
| Adult Content | ☐ | ☑ |
| Opening Credits | ☑ | ☐ |
| Closing Credits | ☑ | ☐ |

Fig. 10

ADAPTIVE MEDIA CONTENT PRESENTATION METHODS AND SYSTEMS

BACKGROUND INFORMATION

Digital media content provides a user with the ability to customize a manner in which the digital media content is presented to the user. For example, during an initial presentation of a movie (e.g., a video-on-demand movie) by a media content access device (e.g., a set-top box device) to a user, the user may direct the media content access device to skip scenes of the movie that are of no interest to the user. Unfortunately, such customization does not carry over to subsequent presentations of the movie. For example, if the user desires to again view the movie without the skipped scenes, he or she has to again manually skip the scenes during the subsequent viewing.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6-10 illustrate various exemplary graphical user interfaces ("GUIs") that may be presented according to principles described herein.

DETAILED DESCRIPTION OF PREFERRED EMBODIMENTS

Figure 1:
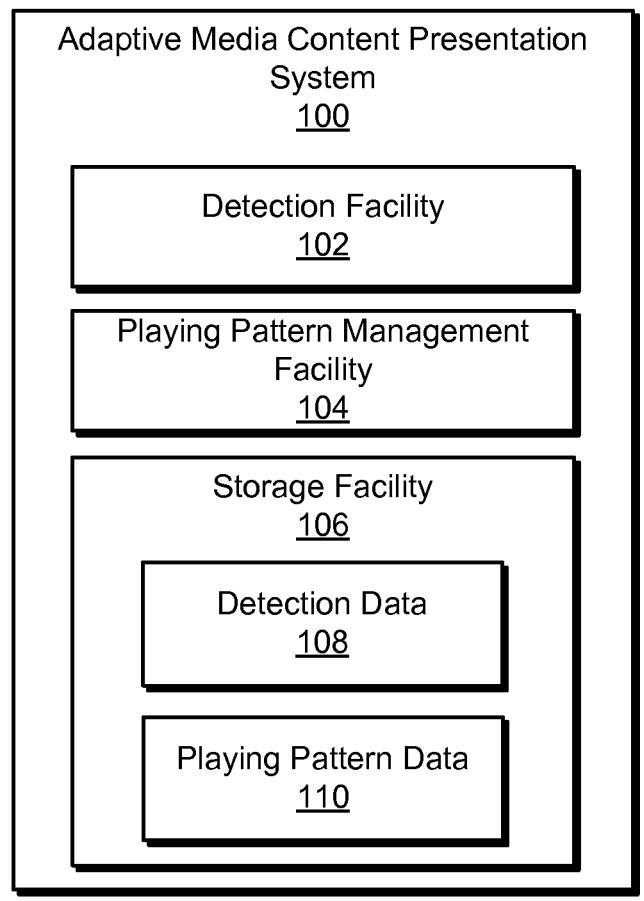
FIG. 1 illustrates an exemplary adaptive media content presentation system according to principles described herein.

Adaptive media content presentation methods and systems are described herein. As will be described below, an adaptive media content presentation system may detect an interaction of a user with a media content program, generate a playing pattern associated with the media content program based on the detected interaction of the user with the media content program, and apply the playing pattern to a presentation of the media content program and/or a presentation of an additional media content program.

As used herein, the terms "media content" and "media content program" may refer to any digital media content that may be accessed by a user by way of a media content access device. For example, exemplary media content includes a television program, an on-demand media program, a pay-per-view media program, a broadcast media program (e.g., a broadcast television program), a multicast media program (e.g., a multicast television program), a narrowcast media program (e.g., a narrowcast video-on-demand program), a digitally recorded program, IPTV media content, an advertisement, a video, a movie, an audio program, a radio program, or any segment, component, or combination of these or other forms of media content.

As used herein, a "playing pattern" defines a particular manner in which a media content program is to be presented to a user. For example, a playing pattern may identify one or more portions of the media content program that are to be skipped during the presentation of the media content program and/or one or more portions of the media content program that are to be included in the presentation of the media content program. Exemplary playing patterns will be described in more detail below.

The methods and systems described herein may allow a user to establish a playing pattern associated with a media content program and then use the playing pattern during one or more presentations of the media content program. To illustrate, the adaptive media content presentation system may detect that a user watches only the last ten minutes of each half of a soccer game being presented by a media content access device. In response, the adaptive media content presentation system may automatically generate a playing pattern that defines this particular viewing sequence. When a user goes to watch the soccer game again, the adaptive media content presentation system may provide the user with an option to watch the soccer game in accordance with the generated playing pattern. If the user selects the option, the adaptive media content presentation system may direct the media content access device to automatically skip to and present the last ten minutes of each half of the soccer game.

The methods and systems described herein may also allow a user to apply a playing pattern associated with a media content program to a presentation of a different media content program. To illustrate, a user may establish a playing pattern associated with a first soccer game, as described in the example above. The user may then decide to watch a second soccer game. The adaptive media content presentation system may provide the user with an option to watch the second soccer game in accordance with the playing pattern associated with the first soccer game. If the user selects the option, the adaptive media content presentation system may direct a media content access device to present the second soccer game in accordance with the playing pattern (e.g., by automatically skipping to and presenting the last ten minutes of each half).

The methods and systems described herein may also allow a user to share a playing pattern associated with a media content program with one or more other users (e.g., one or more social media contacts of the user). For example, as in the previous examples, a user may establish a playing pattern associated with a soccer game. The playing pattern may be made available to other users in any suitable manner. When these users attempt to view the soccer game, the adaptive media content presentation system may provide them with an option to watch the soccer game in accordance with the playing pattern established by the user.

As another example, a parent may establish a playing pattern associated with a movie (e.g., a playing pattern that directs a media content access device to exclude certain types of scenes from a presentation of the movie). The parent may then share the playing pattern with his or her child. When the child attempts to view the movie, the adaptive media content presentation system may prevent the child from viewing the excluded types of scenes.

It will be recognized that these examples are merely illustrative of the many benefits and advantages associated with the methods and systems described herein. Additional benefits and advantages will become apparent herein.

FIG. 1 illustrates an exemplary adaptive media content presentation system 100 ("system 100"). As shown, system 100 may include, without limitation, a detection facility 102, a playing pattern management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect an interaction of a user with a media content program. This may be performed in any suitable manner. For example, detection facility 102 may detect an interaction of the user with the media content program during an initial presentation of the media content program by a media content access device. As used herein, an "initial" presentation of a media content program refers to a presentation of the media content program during which interaction by the user with the media content program is monitored and used to generate a playing pattern. As will be described below, the playing pattern may then be applied to one or more presentations subsequent to the initial presentation of the media content program.

A user may interact with a media content program during a presentation of the media content program by a media content access device in any suitable manner. For example, the user may interact with the media content program by directing the media content access device to skip one or more portions of the media content program during the presentation of the media content program, fast forward through one or more portions of the media content program, rewind through one or more portions of the media content program, play one or more of the media content programs in slow or fast motion, and/or otherwise interact with the media content program. As will be described in more detail below, playing pattern management facility 104 may automatically generate a playing pattern associated with a media content program based on a detected interaction of a user with the media content program during the presentation of the media content program.

Additionally or alternatively, a user may interact with a media content program by interacting with one or more options associated with a presentation of the media content program. This may be performed while the media content program is being presented to the user and/or while the media content program is not being presented to the user.

To illustrate, a user may interact with a media content program by providing input that specifies one or more metadata values that define one or more portions of the media content program that the user desires to exclude or include during a presentation of the media content program. For example, a user may specify that a presentation of a media content program is to include scenes of a particular genre (e.g., action scenes) and exclude scenes of a different genre (e.g., romance scenes). Examples of this will be provided in more detail below.

Playing pattern management facility 104 may be configured to perform one or more playing pattern management operations. For example, playing pattern management facility 104 may generate a playing pattern associated with a media content program based on a detected interaction of a user with the media content program. Playing pattern management facility 104 may then apply the playing pattern to a presentation of the media content program and/or a presentation of an additional media content program. These operations may be performed in any suitable manner.

To illustrate, a user may direct a media content access device to skip one or more portions of a media content program during an initial presentation of the media content program, as described above. In this case, playing pattern management facility 104 may generate a playing pattern associated with the media content program by including information identifying the skipped one or more portions of the media content program in the playing pattern. Playing pattern management facility 104 may then apply the playing pattern to a subsequent presentation of the media content program to the user.

For example, once the playing pattern has been generated, the user may direct the media content access device (or any other media content access device) to again present the media content program. Playing pattern management facility 104 may apply the playing pattern to the subsequent presentation of the media content program by using the information included in the playing pattern to direct the media content access device (or other media content access device directed by the user to present the media content program) to skip the one or more portions of the media content program during the subsequent presentation of the media content program.

Additionally or alternatively, playing pattern management facility 104 may apply the playing pattern to a subsequent presentation of the media content program to another user (i.e., someone other than the user involved with the generation of the playing pattern). For example, a user other than the user involved with the generation of the playing pattern (i.e., an "additional" user) may direct a media content access device to present the media content program. In response, playing pattern management facility 104 may present an option to the additional user to apply the playing pattern to the presentation of the media content program. If the additional user selects the option, playing pattern management facility 104 may apply the playing pattern to the presentation of the media content program to the additional user by using the information included in the playing pattern to direct the media content access device associated with the additional user to skip the one or more portions of the media content program during the presentation of the media content program.

Additionally or alternatively, playing pattern management facility 104 may apply the generated playing pattern to a media content program other than the media content program for which the playing pattern was generated. For example, playing pattern management facility 104 may use the information identifying the skipped one or more portions of the media content program to direct a media content access device to skip, during a presentation of an additional media content program, one or more portions of the additional media content program that temporally correspond to the skipped one or more portions of the media content program. To illustrate, if the playing pattern indicates that the first ten minutes of a first media content program are skipped, playing pattern management facility 104 may direct a media content access device to skip the first ten minutes of a second media content program during a presentation of the second media content program.

In some examples, playing pattern management facility 104 may generate a playing pattern associated with a media content program in accordance with one or more metadata values associated with the media content program. For example, a user may direct a media content access device to skip one or more portions of a media content program during an initial presentation of the media content program, as described above. In response, playing pattern management facility 104 may generate a playing pattern associated with the media content program by identifying one or more metadata values associated with the skipped one or more portions of the media content program and including information representative of the identified one or more metadata values in the playing pattern. Playing pattern management facility 104 may then apply the playing pattern to a presentation of an additional media content program by identifying one or more portions of the additional media content program that have one or more metadata values that match the identified one or more metadata values and excluding the identified one or more portions from the presentation of the additional media content program.

To illustrate, a user may direct a media content access device to skip a romance scene during a presentation of a movie by the media content access device. In some examples, the movie may have an associated metadata value that indicates that the skipped scene is a romance scene. Playing pattern management facility 104 may identify the metadata value and include information representative of the identified metadata value in a playing pattern associated with the movie. Subsequently, the user may direct the media content access device to present an additional movie. Playing pattern management facility 104 may apply the playing pattern to the additional movie by identifying scenes in the additional movie that have metadata values identifying the scenes as being romance scenes and excluding the identified scenes from the presentation of the additional movie.

In some alternative examples, playing pattern management facility 104 may generate a playing pattern associated with a media content program in response to specific input provided by a user. This input may be provided at any time in relation to a presentation of the media content program. For example, the input may be provided prior to an initial presentation of the media content program, during the initial presentation of the media content program, and/or after the initial presentation of the media content program.

To illustrate, playing pattern management facility 104 may provide one or more graphical user interfaces ("GUIs") configured to facilitate user input specifying one or more metadata values that define one or more portions of a media content program that a user desires to exclude during a presentation of the media content program. Additionally or alternatively, the one or more GUIs may be configured to facilitate user input specifying one or more metadata values that define one or more portions of the media content program that the user desires to include during a presentation of the media content program. Playing pattern management facility 104 may generate a playing pattern associated with a media content program by including information representative of the specified one or more metadata values in the playing pattern. An example of this will be provided in more detail below.

In some examples, playing pattern management facility 104 may automatically generate a playing pattern associated with a media content program based on a detected interaction of a user with the media content program (e.g., during an initial presentation of the media content program) in a manner that is transparent to the user. In this manner, the user does not have to worry about specifically directing playing pattern management facility 104 to generate the playing pattern each time the user experiences a media content program.

In some examples, playing pattern management facility 104 may be configured to present an option to a user to apply a playing pattern to a presentation of a media content program. In response to a selection by the user of the option, playing pattern management facility 104 may apply the playing pattern to the presentation of the media content program in any of the ways described herein. Exemplary options that may be presented to a user to apply a playing pattern to a presentation of a media content program will be described in more detail below.

In some alternative examples, playing pattern management facility 104 may be configured to automatically apply a playing pattern to a presentation of a media content program. In this manner, the user may not be given a choice as to whether he or she desires to experience the media content program in accordance with the playing pattern. For example, a parent may select an option that prevents a child from experiencing a media content program without a particular playing pattern being applied to the presentation of the media content program.

In some examples, application of a playing pattern to a presentation of a media content program by playing pattern management facility 104 does not alter or otherwise modify the media content program itself. For example, playing pattern management facility 104 may direct a media content access device to skip one or more portions of a media content program during a presentation of the media content program without modifying the media content program itself. In this manner, the unmodified media content program may be available for subsequent access by the user.

Storage facility 106 may be configured to maintain detection data 108 generated and/or used by detection facility 102 and playing pattern data 110 representative of one or more playing patterns generated by playing pattern management facility 104. Storage facility 106 may maintain additional or alternative data as may serve a particular implementation.

Figure 2:
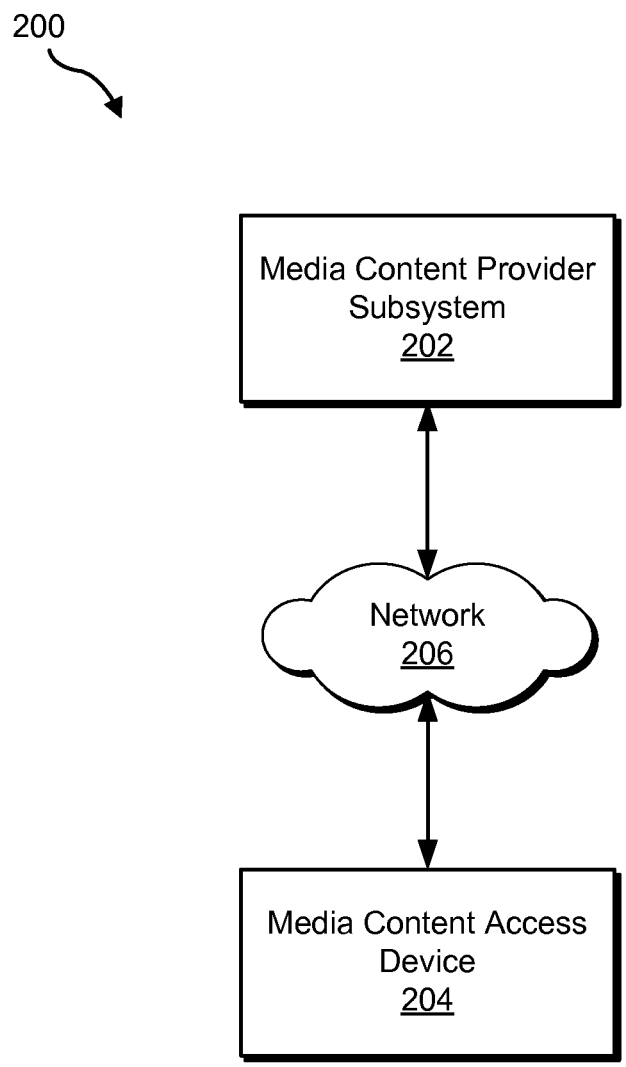
FIG. 2 illustrates an exemplary implementation of the system of FIG. 1 according to principles described herein.

FIG. 2 illustrates an exemplary implementation 200 of system 100 wherein a media content provider subsystem 202 is communicatively coupled to a media content access device 204 by way of a network 206. As will be described in more detail below, detection facility 102, playing pattern management facility 104, and storage facility 106 may each be implemented by media content provider subsystem 202 and/or media content access device 204.

Media content provider subsystem 202 may be associated with a service provider (e.g., a subscriber television service provider, an Internet service provider, a shared media content service provider, etc.) and/or a media content provider (e.g., ESPN, NBC, etc.). Accordingly, media content provider subsystem 202 may be configured to provide one or more media content services (e.g., playing pattern services, television services, video-on-demand services, audio-on-demand services, Internet services, media content sharing services, etc.) to media content access device 204. For example, media content provider subsystem 202 may be configured to manage (e.g., maintain, process, distribute, and/or generate) media content configured to be delivered to media content access device 204. Media content provider subsystem 202 may be implemented by one or more computing devices (e.g., one or more servers) as may serve a particular implementation. For example, media content provider subsystem 202 may be implemented by one or more servers configured to manage one or more playing patterns associated with one or more media content programs.

Media content access device 204 may facilitate access by a user to content (e.g., media content programs) provided by media content provider subsystem 202. For example, media content access device 204 may be configured to perform one or more access events at the direction of a user. To illustrate, media content access device 204 may present and/or record a media content program at the direction of a user. Media content access device 204 may additionally or alternatively be configured to present a media content program in accordance with a playing pattern maintained by media content provider subsystem 202 and/or media content access device 204.

Media content access device 204 may be implemented by any suitable combination of media content processing or computing devices ("processing devices"). For example, media content access device 204 may be implemented by one or more set-top box devices, digital video recording ("DVR")

devices, personal computers, mobile devices (e.g., mobile phones and/or tablet computers), personal-digital assistant devices, gaming devices, television devices, etc.

Media content provider subsystem 202 and media content access device 204 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 202 and media content access device 204 may communicate using any suitable network. For example, as shown in FIG. 2, media content provider subsystem 202 and media content access device 204 may be configured to communicate with each other by way of network 206. Network 206 may include one or more networks or types of networks capable of carrying communications and/or data signals between media content provider subsystem 202 and media content access device 204. For example, network 206 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by media content provider subsystem 202 or by media content access device 204. In other embodiments, components of system 100 may be distributed across any combination of media content provider subsystem 202 and media content access device 204.

Figure 3:
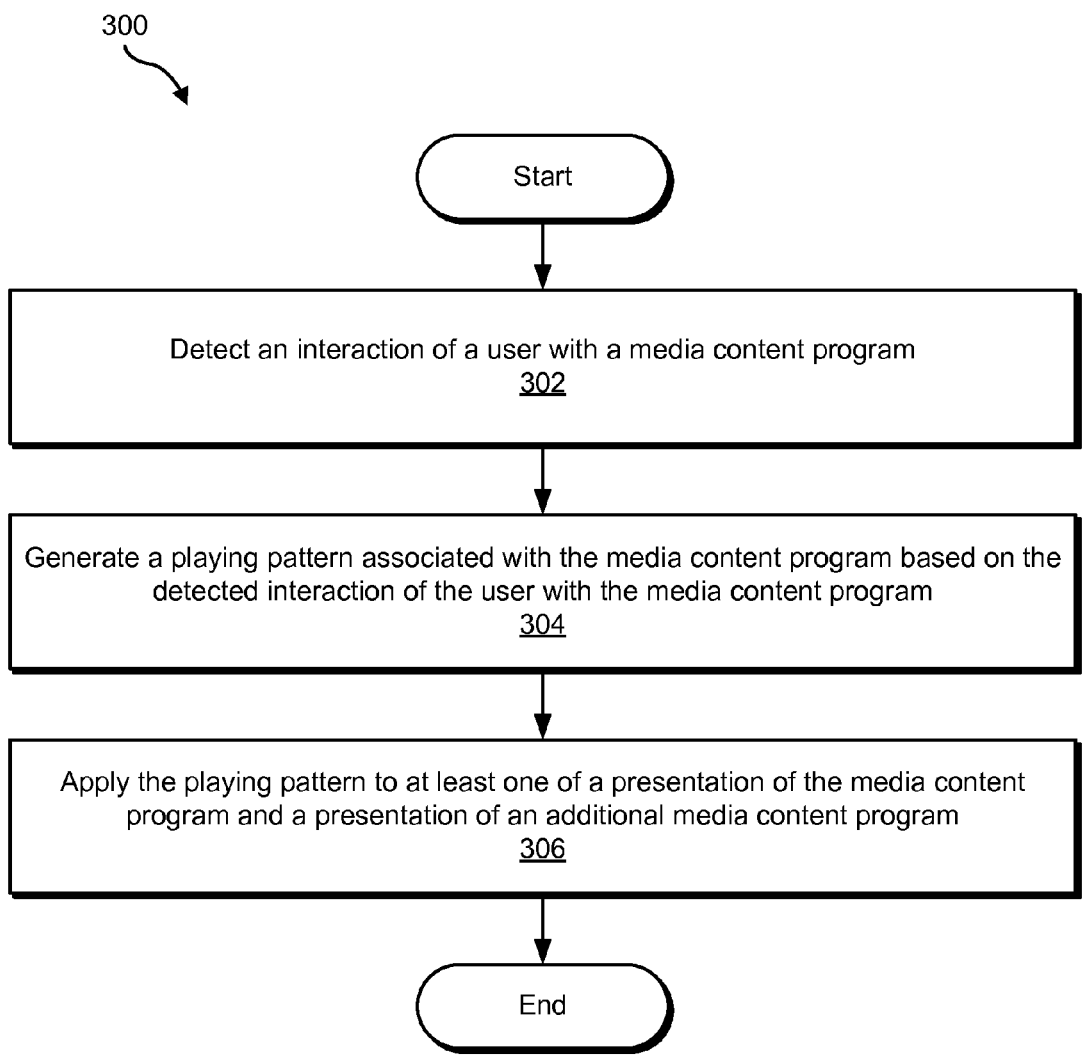
FIGS. 3-5 illustrate exemplary adaptive media content presentation methods according to principles described herein.
Figure 4:
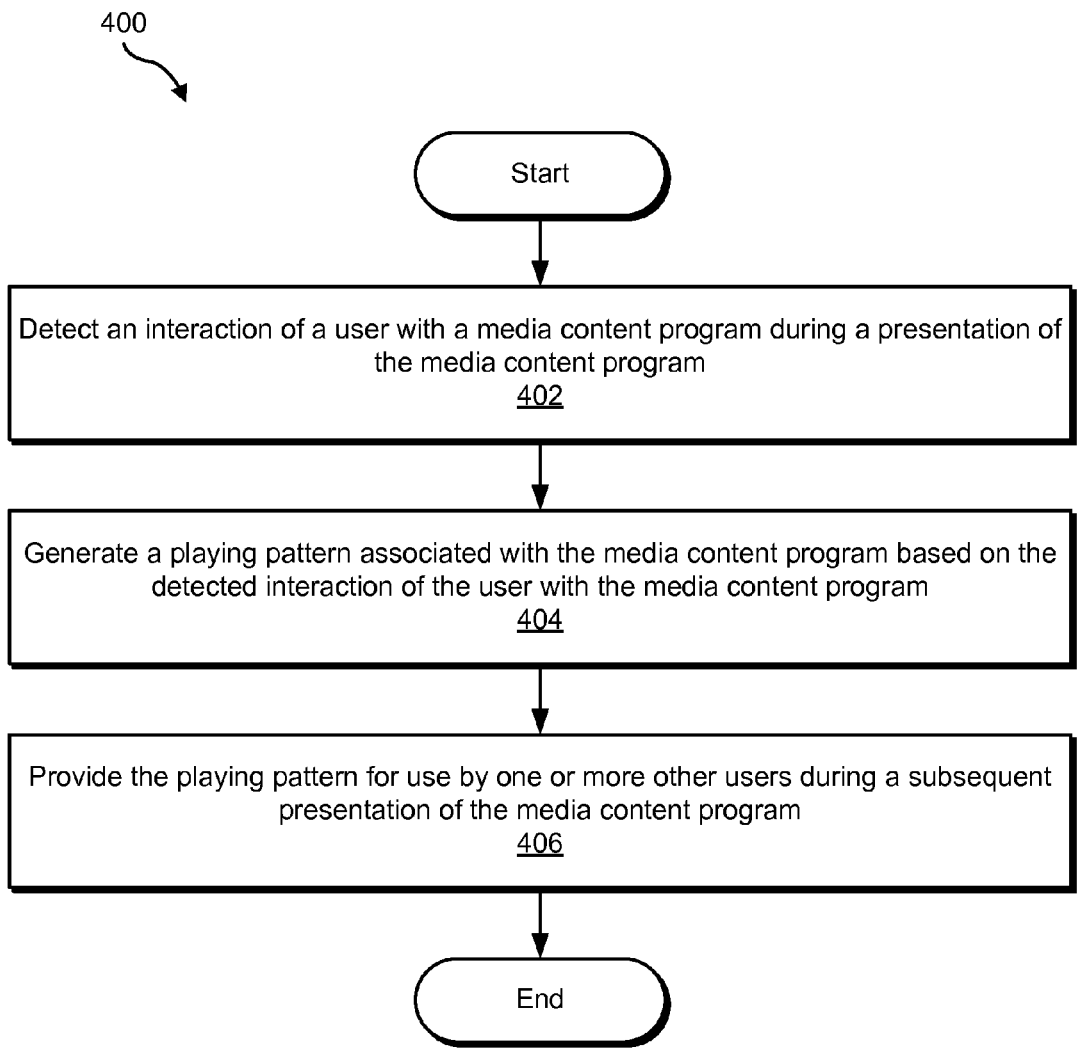
Figure 5:
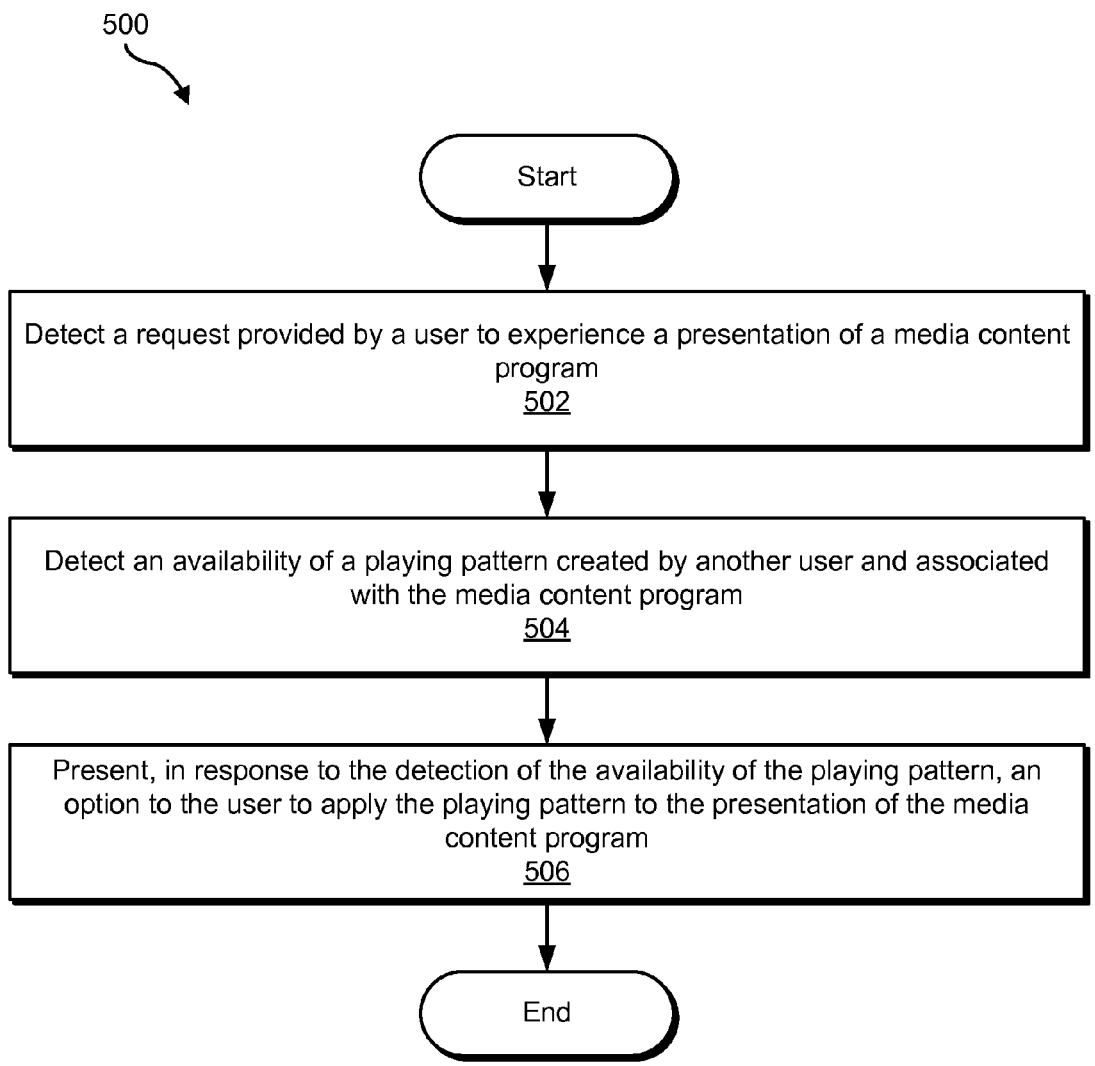

FIGS. 3-5 illustrate exemplary adaptive media content presentation methods 300, 400, and 500, respectively. While FIGS. 3-5 illustrate exemplary steps according to one embodiment, other embodiments may omit, add to, reorder, and/or modify any of the steps shown in FIGS. 3-5. One or more of the steps shown in FIGS. 3-5 may be performed by system 100 and/or any implementation thereof.

With reference to FIG. 3, an adaptive media content presentation system detects an interaction of a user with a media content program in step 302. Step 302 may be performed in any of the ways described herein.

In step 304, the adaptive media content presentation system generates a playing pattern associated with the media content program based on the detected interaction of the user with the media content program. Step 304 may be performed in any of the ways described herein.

In step 306, the adaptive media content presentation system applies the playing pattern to at least one of a presentation of the media content program and a presentation of an additional media content program. Step 306 may be performed in any of the ways described herein.

With reference now to FIG. 4, an adaptive media content presentation detects an interaction of a user with a media content program during a presentation of the media content program system in step 402. Step 402 may be performed in any of the ways described herein.

In step 404, the adaptive media content presentation system generates a playing pattern associated with the media content program based on the detected interaction of the user with the media content program. Step 404 may be performed in any of the ways described herein.

In step 406, the adaptive media content presentation system provides the playing pattern for use by one or more other users during a subsequent presentation of the media content program. Step 406 may be performed in any of the ways described herein.

With reference now to FIG. 5, an adaptive media content presentation detects a request provided by a user to experience a presentation of a media content program in step 502. Step 502 may be performed in any of the ways described herein.

In step 504, the adaptive media content presentation system detects an availability of a playing pattern created by another user and associated with the media content program. Step 504 may be performed in any of the ways described herein.

In step 506, the adaptive media content presentation system presents, in response to the detection of the availability of the playing pattern, an option to the user to apply the playing pattern to the presentation of the media content program. Step 506 may be performed in any of the ways described herein.

Various implementations of the methods and systems described herein will now be described. It will be recognized that the implementations described herein are merely illustrative of the many different implementations that may be realized in connection with the methods and systems described herein.

Figure 6:
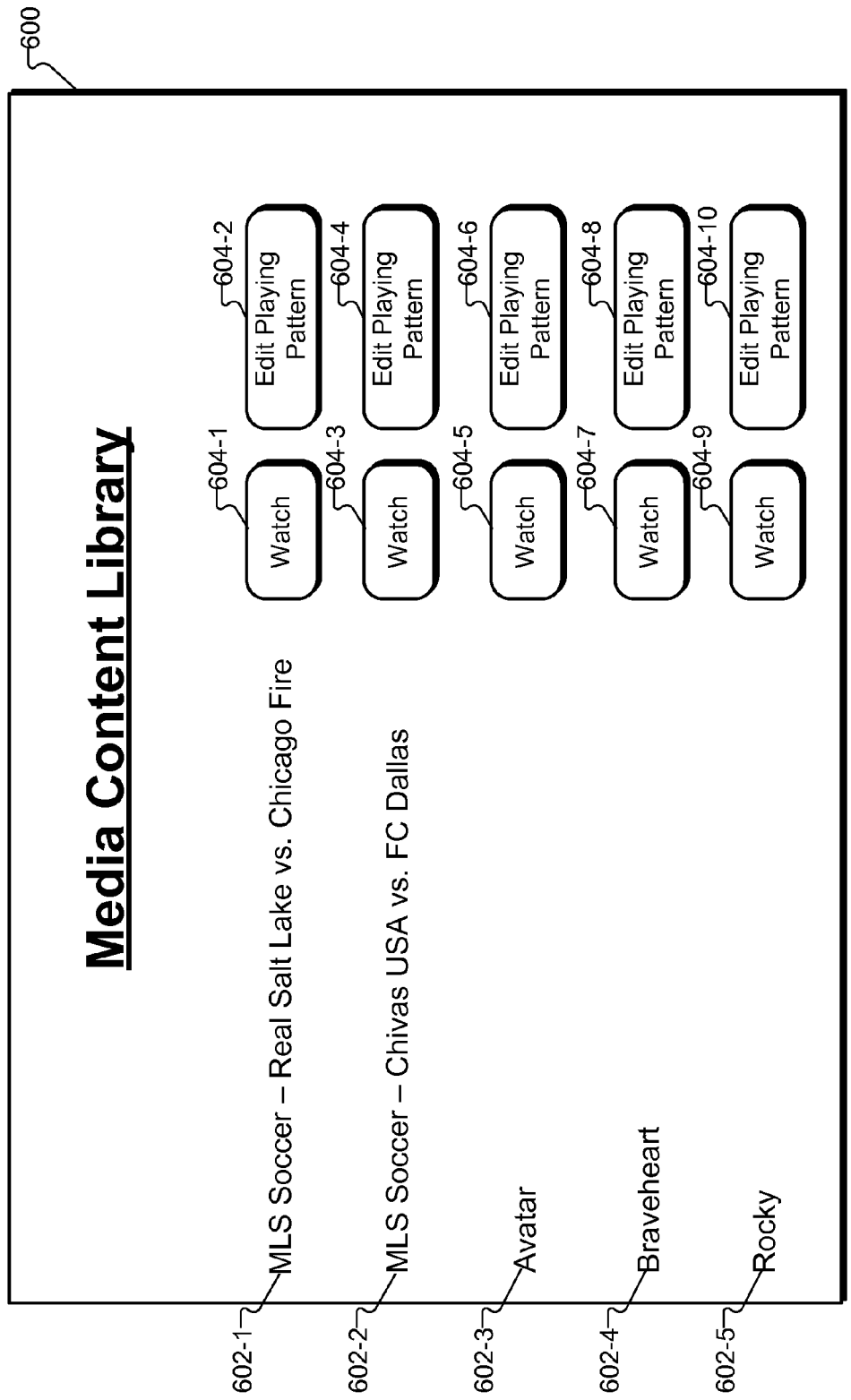

FIG. 6 illustrates an exemplary GUI 600 that may be presented to a user and that may be used by the user to access one or more media content programs included in a media content library. In the example of FIG. 6, the media content library includes media content programs 602-1 through 602-5, collectively referred to herein as "media content programs 602". For purposes of this example, media content programs 602-1 and 602-2 are representative of first and second soccer games, respectively, and media content program 602-3 through 602-5 are representative of first, second, and third movies, respectively. It will be recognized, however, that the media content library may include a collection of any type of media content program available to a user as may serve a particular implementation. For example, the media content library may include DVR content, video or audio-on-demand content, locally stored media content (e.g., media content stored by a media content access device), remotely storage media content (e.g., media content stored by a remote server), and/or any other type of media content as may serve a particular implementation.

As shown, various options 604 (e.g., options 604-1 through 604-10) associated with media content programs 602 included in the media content library may be presented within GUI 600. For example, a user may select option 604-1 to watch the first media content program 602-1 (e.g., by directing a media content access device to present the first media content program 602-1). In response, system 100 may determine whether a playing pattern associated with media content program 602-1 is available for application to a presentation of media content program 602-1.

To illustrate, the user may have already watched media content program 602-1 prior to selecting option 604-1. During the prior presentation of media content program 602-1, system 100 may have generated a playing pattern associated with media content program 602-1. In this case, system 100 may detect an availability of the playing pattern and provide the user with an option to apply the playing pattern to the requested presentation of media content program 602-1. The option to apply the playing pattern to the requested presentation of media content program 602-1 may be presented to the user in any suitable manner.

Figure 7:
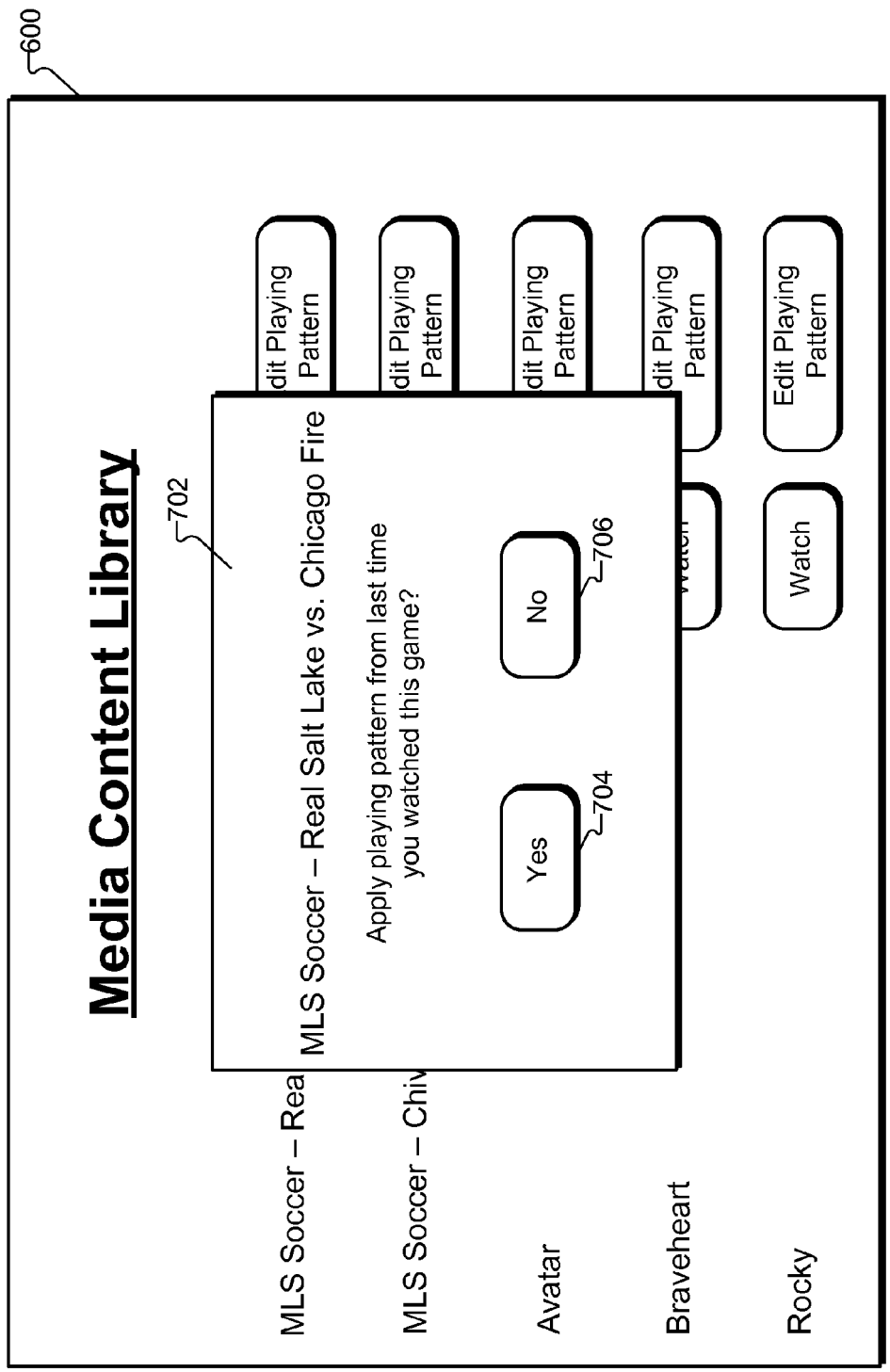

To illustrate, FIG. 7 shows an exemplary pop-up window 702 that may be presented within GUI 600 and that may present an option to apply an already established playing pattern to a requested presentation of media content program 602-1. As shown, the user may select option 704 from within pop-up window 702 to direct system 100 to apply the playing pattern to the presentation of media content program 602-1. Alternatively, the user may select option 706 from within pop-up window 702 to direct system 100 to abstain from applying the playing pattern to the presentation of media content program 602-1. Pop-up window 702 is merely illustrative of the many different ways in which an option to apply playing pattern to a requested presentation of the media content program may be presented to a user.

As another example, system 100 may detect that one or more other users have already established a playing pattern associated with media content program 602-1. In this case, system 100 may provide the user with an option to apply any one of the already established patterns to the requested presentation of media content program 602-1.

Figure 8:
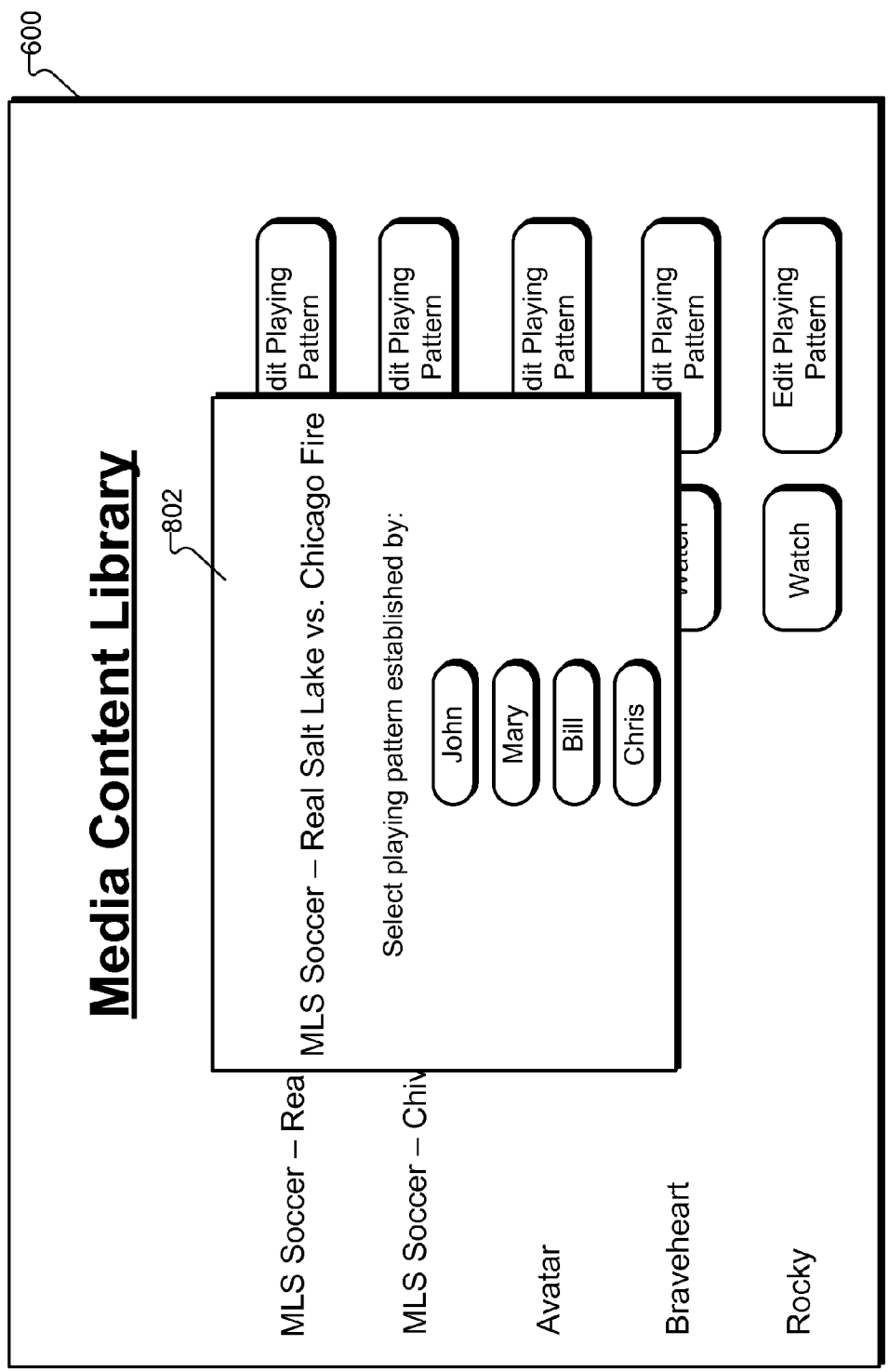

To illustrate, FIG. 8 shows an exemplary pop-up window 802 that may be presented within GUI 600 and that may present an option to the user to apply a playing pattern established by one or more other users to the requested presentation of media content program 602-1. As shown, the user may select a playing pattern established by a user named "John", a user named "Mary", a user named "Bill", or a user named "Chris". In response to a selection of a playing pattern established by another user, system 100 may apply the selected playing pattern to the presentation of media content program 602-1.

The particular playing patterns options presented within pop-up window 802 may be selected by system 100 in any suitable manner. For example, system 100 may present an option to select a playing pattern established by one or more social media contacts of the user, one or more users selected by the user (e.g., one or more family members), one or more users of a particular media content service (e.g., a subscriber television service), and/or any other type of user as may serve a particular implementation.

As another example, system 100 may detect that a playing pattern associated with another media content program has been generated and is available at the time of the request to present media content program 602-1. In this case, system 100 may provide the user with an option to apply the playing pattern associated with the other media content program to the requested presentation of media content program 602-1.

For example, system 100 may detect that the user has already established a playing pattern associated with media content program 602-2. System 100 may further detect that both media content program 602-1 and media content program 602-2 are representative of soccer games. In response, system 100 may provide an option to the user to apply the already established playing pattern associated with media content program 602-2 to the presentation of media content program 602-1.

Figure 9:
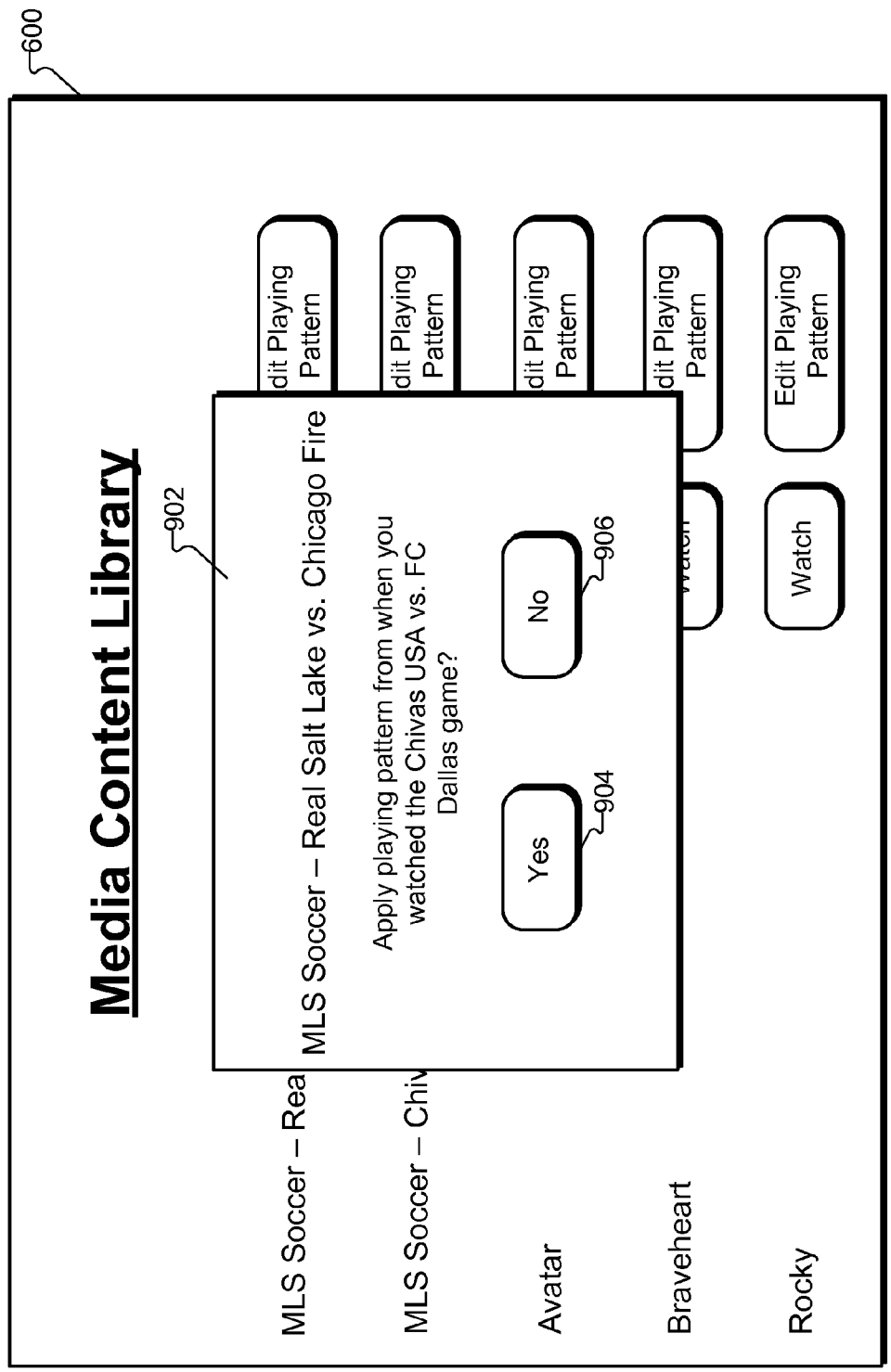

To illustrate, FIG. 9 shows an exemplary pop-up window 902 that may be presented within GUI and that may present an option to apply a playing pattern associated with media content program 602-2 to a presentation of media content program 602-1. As shown, the user may select option 904 from within pop-up window 902 to direct system 100 to apply the playing pattern associated with media content program 602-2 to the presentation of media content program 602-1. Alternatively, the user may select option 906 from within pop-up window 902 to direct system 100 to abstain from applying the playing pattern associated with media content program 602-2 to the presentation of media content program 602-1.

Returning to FIG. 6, the user may select an option to edit a playing pattern associated with a media content program included in the media content library. For example, the user may select option 604-2 to edit a playing pattern associated with media content program 602-1. In response, system 100 may present one or more GUIs configured to facilitate creation and/or editing of a playing pattern associated with media content program 602-1.

To illustrate, FIG. 10 shows an exemplary GUI 1000 that may be presented to the user and that may facilitate creation and/or editing of a playing pattern for media content program 602-3. As shown, the user may utilize GUI 1000 to select one or more types of scenes that the user desires to include within a presentation of media content program 602-3 and/or one or more types of scenes that the user desires to exclude from the presentation of media content program 602-3. For example, FIG. 10 shows that the user has selected an option to include action scenes, scary scenes, opening credits, and closing credits within a presentation of media content program 602-3. FIG. 10 also shows that the user has selected an option to exclude romance scenes and adult content from the presentation of media content program 602-3. Such scenes may be identified by system 100 based on metadata associated with one or more portions of the media content program 602-3, such as described herein.

Once the user has specified the contents of the playing pattern associated with media content program 602-3, the user may then select option 1002 to save the playing pattern. The saved playing pattern may then be applied by system 100 to a presentation of media content program 602-3 and/or any other media content program included in the media content library (e.g., media content programs 602-4 and 602-5).

For example, with reference again to FIG. 6, the user may select option 604-7 to watch media content program 602-4. In response, system 100 may present an option to the user to apply the playing pattern associated with media content program 602-3 to the presentation of media content program 602-4. If the user selects the option, system 100 may apply the playing pattern associated with media content program 602-3 to the presentation of media content program 602-4.

It will be recognized that a user may create and/or edit a playing pattern for a media content program in any other way as may serve a particular implementation. For example, system 100 may present one or more GUIs (e.g., one or more GUIs that emulate a video and/or audio editing tool) that facilitate manual selection of one or more portions of a media content program to be included within a presentation of the media content program and/or one or more portions of the media content program to be excluded from the presentation of the media content program.

It will also be recognized that a user may create multiple playing patterns for a particular media content program. Each playing pattern may be given a unique name by the user. The user may then be presented with an option to apply any one of the multiple playing patterns to a presentation of the media content program and/or one or more other media content programs.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
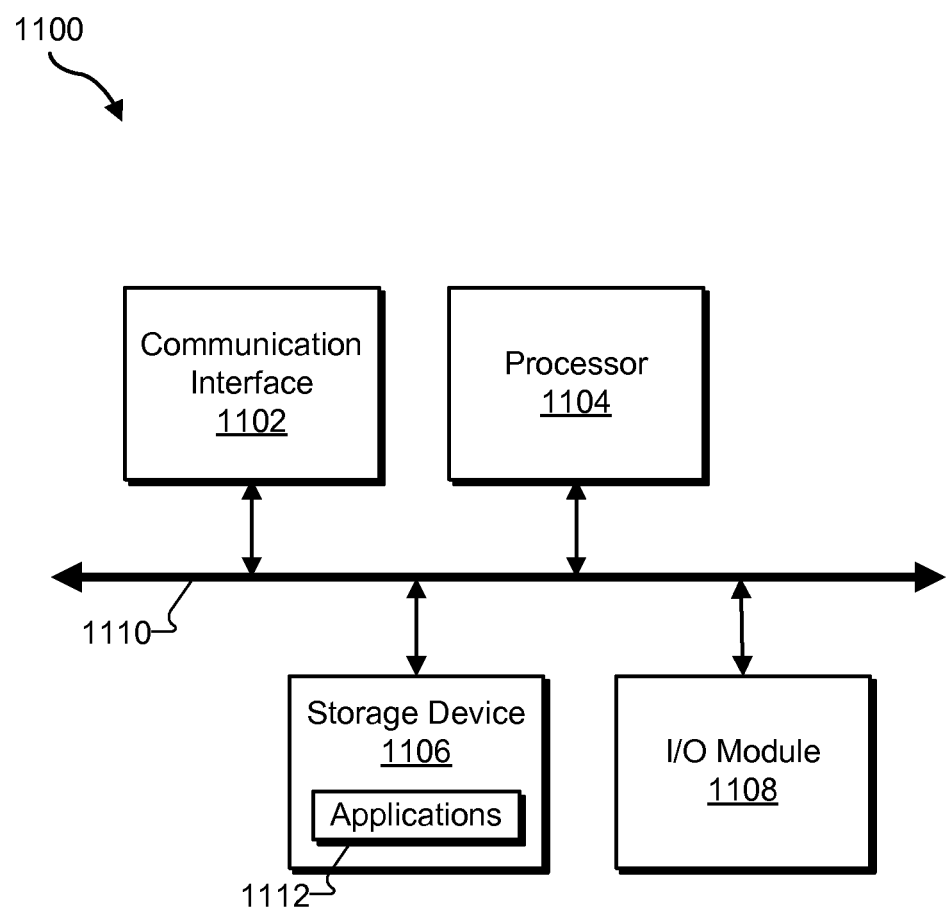
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102 and/or playing pattern management facility 104. Likewise, storage facility 106 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

detecting, by an adaptive media content presentation system, an interaction of a user with a media content program during an initial presentation of the media content program by a media content access device, the interaction of the user comprising the user directing the media content access device to skip one or more scenes of the media content program during the initial presentation of the media content program;

generating, by the adaptive media content presentation system in response to the detected interaction of the user during the initial presentation of the media content program and based on the detected interaction, a playing pattern associated with the initial presentation of the media content program by identifying one or more metadata values associated with the skipped one or more scenes of the initial presentation the media content program and including information representative of the one or more metadata values in the playing pattern;

detecting, by the adaptive media content presentation system after the initial presentation of the media content program, a request provided by the user for the adaptive media content presentation system to present at least one of a subsequent presentation of the media content program and an additional media content program;

presenting, by the adaptive media content presentation system in response to the detecting of the request, an option to the user to apply the playing pattern to at least one of the subsequent presentation of the media content program and a presentation of the additional media content program; and applying, by the adaptive media content presentation system in response to a selection by the user of the option, the playing pattern to at least one of the subsequent presentation of the media content program and the presentation of the additional media content program.

2. The method of claim 1, wherein the generating of the playing pattern comprises automatically generating the playing pattern during the initial presentation of the media content program in a manner that is transparent to the user.

3. The method of claim 1, wherein the applying of the playing pattern to the subsequent presentation of the media content program comprises using the information representative of the one or more metadata values to identify the skipped one or more scenes of the initial presentation of the media content program and directing the media content access device to skip the one or more scenes of the media content program during the subsequent presentation of the media content program.

4. The method of claim 1, wherein the presentation of the additional media content program is performed by an additional media content access device associated with an additional user, and wherein the applying of the playing pattern to the presentation of the additional media content program comprises using the information representative of the one or more metadata values to identify the skipped one or more scenes of the initial presentation of the media content program and directing the additional media content access device to skip the one or more scenes of the media content program during the presentation of the additional media content program by the additional media content access device.

5. The method of claim 1, wherein the applying of the playing pattern to the presentation of the additional media content program comprises using the information representative of the one or more metadata values to identify the skipped one or more scenes of the initial presentation of the media content program and directing one or more media content access devices to skip one or more scenes of the additional media content program that temporally correspond to the skipped one or more scenes of the media content program during the presentation of the additional media content program.

6. The method of claim 1, wherein the applying of the playing pattern to the presentation of the additional media content program comprises:
identifying one or more portions of the additional media content program that have one or more metadata values that match the identified one or more metadata values; and
excluding the identified one or more portions from the presentation of the additional media content program.

7. The method of claim 1, wherein:
the detecting of the interaction of the user with the media content program comprises detecting input provided by the user that specifies the identified one or more metadata values, the identified one or more metadata values defining one or more scenes of the media content program that the user desires to exclude during the presentation of the media content program.

8. The method of claim 7, wherein the applying of the playing pattern to the presentation of the additional media content program comprises:
identifying one or more portions of the additional media content program that have one or more metadata values that match the identified one or more metadata values; and
excluding the identified one or more portions from the presentation of the additional media content program.

9. The method of claim 1, wherein:
the detecting of the interaction of the user with the media content program comprises detecting input provided by the user that specifies the identified one or more metadata values, the identified one or more metadata values defining one or more scenes of the media content program that the user desires to include during the presentation of the media content program.

10. The method of claim 9, wherein applying of the playing pattern to the presentation of the additional media content program comprises:
identifying one or more portions of the additional media content program that have one or more metadata values that match the identified one or more metadata values; and
including the identified one or more portions in the presentation of the additional media content program.

11. The method of claim 1, embodied as computer-executable instructions on at least one non-transitory computer-readable medium.

12. A method comprising:
detecting, by an adaptive media content presentation system, an interaction of a user with a media content program during an initial presentation of the media content program by a media content access device, the interaction of the user comprising the user directing the media content access device to skip one or more scenes of the media content program during the initial presentation of the media content program;

generating, by the adaptive media content presentation system in response to the detected interaction of the user during the initial presentation of the media content program and based on the detected interaction, a playing pattern associated with the initial presentation of the media content program by identifying one or more metadata values associated with the skipped one or more scenes of the initial presentation of the media content program and including information representative of the one or more metadata values in the playing pattern;

detecting, by the adaptive media content presentation system after the initial presentation of the media content program, a request provided by an additional user for the adaptive media content presentation system to present at least one of a subsequent presentation of the media content program and an additional media content program; and presenting, by the adaptive media content presentation system in response to the detecting of the request, an option to the additional user to apply the playing pattern to at least one of the subsequent presentation of the media content program and a presentation of the additional media content program.

13. The method of claim 12, further comprising providing, by the adaptive media content presentation system, the playing pattern for use by at least one of the user and the additional user during the presentation of the additional media content program.

14. The method of claim 12, further comprising applying, by the adaptive media content presentation system in response to a selection by the additional user of the option, the playing pattern to at least one of the subsequent presentation of the media content program and the presentation of the additional media content program.

15. The method of claim 12, wherein the additional user is at least one of a social media contact of the user and a family member of the user.

16. A method comprising:
   detecting, by an adaptive media content presentation system, a request provided by a user to experience a presentation of a media content program;
   detecting, by the adaptive media content presentation system, an availability of a plurality of playing patterns created by a plurality of other users and associated with the media content program, the plurality of playing patterns each defining a particular manner in which each of the plurality of other users interacted with the media content program during presentation of the media content program to the plurality of other users, wherein the particular manner in which each of the plurality of users interacted with the media content program comprises a request by each of the plurality of users to skip one or more scenes of the media content program during the presentation of the media content program; and
   presenting, by the adaptive media content presentation system in response to the detecting of the availability of the plurality of playing patterns, a plurality of options to the user to apply a playing pattern from the plurality of playing patterns to the presentation of the media content program.

17. The method of claim 16, further comprising:
   detecting, by the adaptive media content presentation system, a selection by the user of an option from the plurality of options, the option corresponding to the playing pattern; and
   applying, by the adaptive media content presentation system in response to the selection by the user of the option from the plurality of options, the playing pattern to the presentation of the media content program.

18. A system comprising:
   a detection facility that
      detects an interaction of a user with a media content program during an initial presentation of the media content program by a media content access device, the interaction of the user comprising the user directing the media content access device to skip one or more scenes of the media content program during the initial presentation of the media content program, and
      detects, after the initial presentation of the media content program, a subsequent request of the user to present at least one of the media content program and an additional media content program; and
   a playing pattern management facility communicatively coupled to the detection facility and that
      generates, in response to the detected interaction of the user during the initial presentation of the media content program and based on the detected interaction, a playing pattern associated with the initial presentation of the media content program by identifying one or more metadata values associated with the skipped one or more scenes of the initial presentation of the media content program and including information representative of the one or more metadata values in the playing pattern,
      presents, in response to the subsequent request detected by the detection facility, an option to the user to apply the playing pattern to at least one of a subsequent presentation of the media content program and a presentation of the additional media content program, and
      applies, in response to a selection by the user of the option, the playing pattern to at least one of the subsequent presentation of the media content program and the presentation of the additional media content program.

* * * * *